(12) United States Patent
Laurent et al.

(10) Patent No.: US 8,631,745 B2
(45) Date of Patent: Jan. 21, 2014

(54) METHOD AND APPARATUS FOR TENSIONING A CABLE

(75) Inventors: Jean-Claude Laurent, Saint Nicolas de Macherin (FR); Mathieu Lefort, Voiron (FR); Gregory Lucas, Saint Egreve (FR)

(73) Assignee: Pomagalski, Voreppe (FR)

( * ) Notice: Subject to any disclaimer, the term of this patent is extended or adjusted under 35 U.S.C. 154(b) by 0 days.

(21) Appl. No.: 13/640,362

(22) PCT Filed: Apr. 15, 2011

(86) PCT No.: PCT/FR2011/000228
§ 371 (c)(1),
(2), (4) Date: Jan. 22, 2013

(87) PCT Pub. No.: WO2011/128532
PCT Pub. Date: Oct. 20, 2011

(65) Prior Publication Data
US 2013/0118372 A1    May 16, 2013

(30) Foreign Application Priority Data

Apr. 16, 2010  (FR) ...................................... 10 01641

(51) Int. Cl.
  *B61B 7/00*          (2006.01)
(52) U.S. Cl.
  USPC .......................... 104/196; 104/197; 104/173.1
(58) Field of Classification Search
  USPC ................. 104/196, 197, 198, 202, 203, 204,
        104/172.4, 173.1, 173.2, 174, 180, 178, 112
  See application file for complete search history.

(56) References Cited

U.S. PATENT DOCUMENTS

| 5,119,733 A | 6/1992 | Brochand |
| 7,036,435 B2 | 5/2006 | Morand et al. |

FOREIGN PATENT DOCUMENTS

| EP | 0324384 A2 | 7/1989 |
| EP | 1396408 A1 | 3/2004 |
| FR | 2661147 A1 | 10/1991 |

*Primary Examiner* — Jason C Smith
(74) *Attorney, Agent, or Firm* — Bachman & LaPointe, P.C.

(57) ABSTRACT

A method for tensioning a cable uses a tensioning installation comprising a pulley over which the cable passes, a support trolley for the mobile pulley, on a guide rail and one or several linear actuators to move the trolley. The method allows for coupling an actuator, in a first position between a first support point fixed relative to the rail and a second support point fixed relative to the trolley such that the trolley moves on a first segment of the rail and the actuator is controlled as a function of the set tension of the cable decoupling the actuator from its first position; and coupling an actuator, in a second position between a third support point fixed relative to the rail and a fourth support point fixed relative to the trolley, at least one of the third support point or the fourth support point being distinct from the first support point and the second support point such that the trolley moves on a second segment of the rail and the actuator is controlled as a function of the set tension of the cable. A cable tensioning installation and a cable transport installation are described.

10 Claims, 2 Drawing Sheets

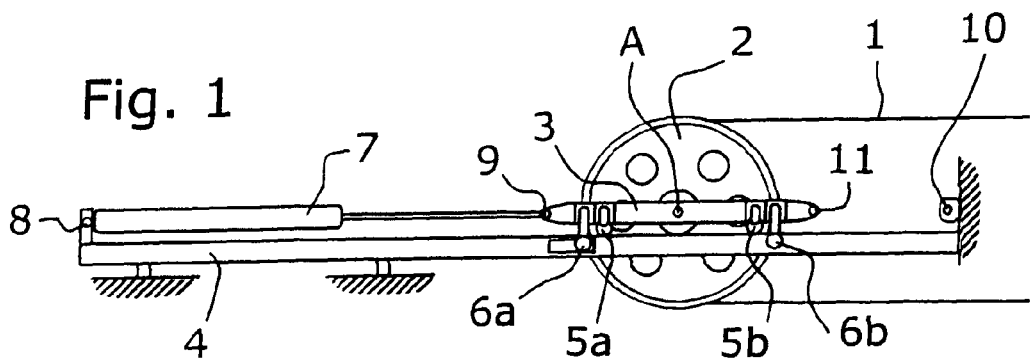
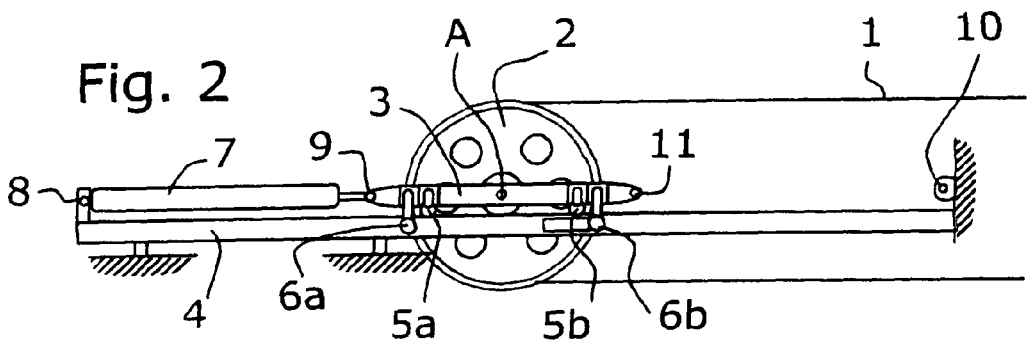
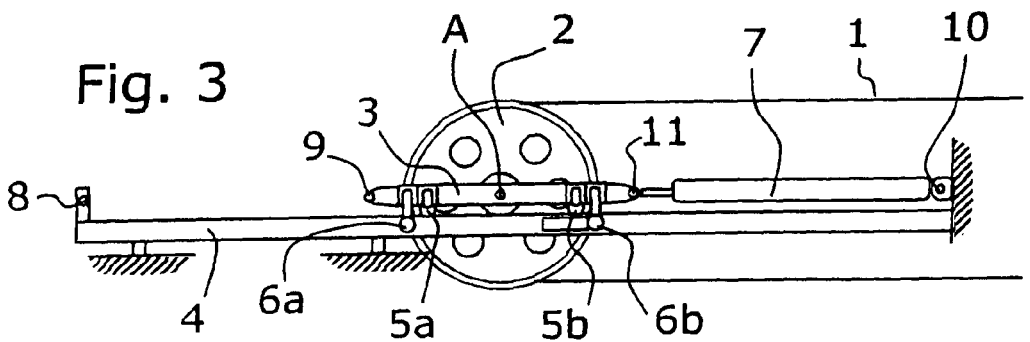
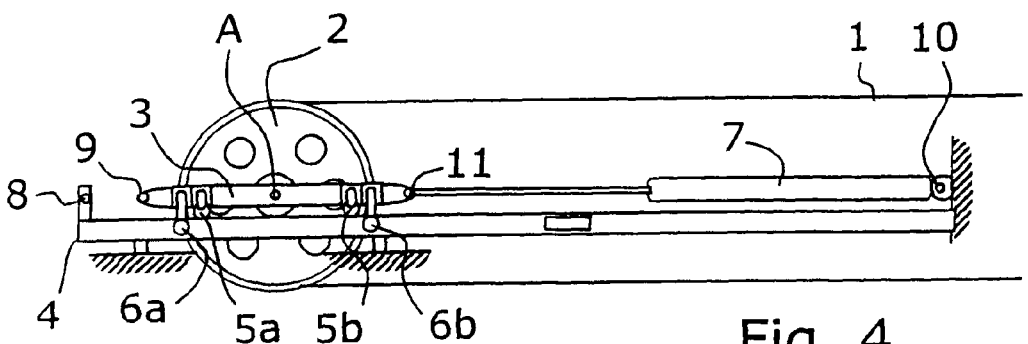

METHOD AND APPARATUS FOR TENSIONING A CABLE

BACKGROUND

The invention relates to a cable tensioning installation and a cable tensioning method.

In particular, the invention relates to the field of cable transport installations.

The tension of the cable in a cable transport installation must be kept within a given range to assure that the installation remains safe. However, many conditions affect the tension of the cable, and in particular the vehicle load has a large influence on the tension of the cable. Similarly, the installation operating temperature that can vary between more than 25° C. during the summer and less than −30° C. in the winter has a large influence on the tension of the cable. Finally, creep deformations are applicable to the cable in the long term.

Tensioning stations have to be fitted on cable transport installations to keep the tension of the cable within an optimum range, regardless of the operating conditions of the installation.

In prior art, a pulley over which the cable to be tensioned passes is mounted on a trolley in order to adjust the tension of the cable. This trolley is mounted free to move on a guide rail and is moved by an actuator in the direction required to slacken or tension the cable.

The actuator, for example a jack, has one end fixed relative to the guide rail and the other end is mounted on the trolley so as to move the trolley together with the piston. One description of such an embodiment is given in document FR 2 661 147 in the name of the applicant.

However, this type of tensioning installation occupies a relatively large amount of space in the longitudinal direction relative to the trolley travel distance. Considering the structure of a jack, its stroke is usually only half of its longitudinal dimension when it is extended. Consequently, the segment of rail on which the trolley moves is not more than half as long as the longitudinal dimension of the tensioning installation. Thus, when the cable tensioning installation has to absorb large cable tension variations, it becomes very large.

Thus, these tensioning stations are not satisfactory for applications in which the space available to house the tensioning installation is restricted.

SUMMARY OF THE INVENTION

The invention aims to overcome these problems by disclosing a cable tensioning method and a compact tensioning station capable of keeping the tension of the cable within a given operating range for a large variation range in cable tension conditions.

According to a first aspect, the invention achieves this by disclosing a cable tensioning method using a tensioning installation comprising a pulley over which said cable passes, a support trolley for said mobile pulley, on a guide rail running along a longitudinal axis between a first and a second extreme points so as to adjust the tension of the cable as a function of a set tension of the cable and one or several linear actuators to move the trolley along said longitudinal axis. Said method consists of:

coupling an actuator in a first position between a first support point fixed relative to the rail and a second support point fixed relative to the trolley, such that the trolley moves on a first segment of the rail extending between the first extreme point and an intermediate point and said actuator is controlled as a function of the set tension of the cable;

decoupling the actuator from its first position;

coupling an actuator in a second position between a third support point fixed relative to the rail and a fourth support point fixed relative to the trolley, at least one of the third or the fourth support point being distinct from the first and the second support points such that the trolley moves on a second segment of the rail running between an intermediate point and a second extreme point and said actuator is controlled as a function of the set tension of the cable.

Thus, according to the invention, at least two actuator coupling positions are provided defining two distinct trolley displacement segments such that the total displacement range of the trolley is larger than the actuator stroke, without increasing the overall length of the tensioning installation.

Advantageously, the first and second segments overlap in an intermediate zone. Thus, this superposition of two displacement segments limits the number of actuator position changes when the set value of the position of the trolley varies around an intermediate position of the rail.

Advantageously, an actuator is coupled in a first position when the force applied by the actuator corresponding to the set tension of the cable is reached for a position of the trolley between the first extreme point and the intermediate zone, and an actuator is coupled in its second position when the force applied by the actuator corresponding to the set tension of the cable is reached for a position of the trolley between the intermediate zone and the second extreme point.

In one embodiment of the invention, the first and third support points are distinct and are located on each side of a central point half way between the first and the second extreme points, the actuator applying a tension force on the trolley in its first or its second position, and a thrust force in the other position.

Advantageously, the second and fourth support points are distinct and are located on each side of a median transverse axis of the trolley.

According to a second aspect, the invention relates to a cable tensioning installation comprising:

a pulley over which said cable passes;

a support trolley for said mobile pulley, on a guide rail running along a longitudinal axis between first and second extreme points so as to adjust the cable tension;

one or several linear actuators to move the trolley along said longitudinal axis;

means of coupling an actuator between a first support point fixed relative to the rail and a second support point fixed relative to the trolley; and means of coupling an actuator between a third support point fixed relative to the rail and a fourth support point fixed relative to the trolley, at least the third and the fourth support points being distinct from the first and second support points.

In one embodiment, the first and the third support points are distinct and are respectively located on each side of a central point half way between the first and the second extreme points.

Advantageously, the second and the fourth support points are distinct and are respectively located on each side of a median transverse axis of the trolley.

In one embodiment, the actuator is a double acting jack. Thus, a single jack can be used to apply a tension force and a thrust force on the trolley.

Finally, according to a third aspect, the invention relates to a cable transport installation in which said cable forms a closed loop between two stations, at least one vehicle being drawn by the cable circulating between the two stations, the transport installation comprising a cable tensioning installation according to the second aspect of the invention.

BRIEF DESCRIPTION OF THE DRAWINGS

Other purposes and advantages of the invention will become clear in the following description made with reference to the appended drawings among which:

FIG. 1 shows a cable tensioning installation when the trolley is located at its first extreme point and an actuator is coupled to the installation in a first position in which it enables displacement of the trolley on a first segment, by applying a tension force on said trolley;

FIG. 2 shows the installation in FIG. 1 in which the actuator is coupled to the installation in its first position, the trolley being located at the end of the first segment opposite the first extreme point;

FIG. 3 shows the installation in FIG. 1 when the actuator changes from its first position to its second position;

FIG. 4 shows the installation in FIG. 1 when the trolley is located at its second extreme point and an actuator is coupled to the installation in a second position in which the trolley can move on a second segment, when a thrust force is applied on said trolley;

DETAILED DESCRIPTION OF THE PREFERRED EMBODIMENTS

The invention relates particularly to the domain of cable transport installations. Such an installation usually comprises at least one cable 1 extending in a closed loop between two stations and one or several vehicles drawn by said cable 1 and running between the two stations. The vehicles may be suspended from the cable 1 or may run on rails.

The cable transport installation includes a cable tensioning installation to adjust the tension in the cable 1 as a function of a set value. The set value is usually defined as a range of allowable tension values considering safety conditions of the installation.

In the following description, the longitudinal, lateral and transverse directions are defined relative to the tension direction of the cable 1.

The cable tensioning installation comprises a pulley 2 over which the cable 1 to be tensioned passes and a support trolley 3 for said pulley 2. The pulley 2 is mounted free to rotate on said trolley 3 about an axis A. The trolley 3 is mounted free to slide on a guide rail 4 running along a longitudinal axis.

Figure 5:
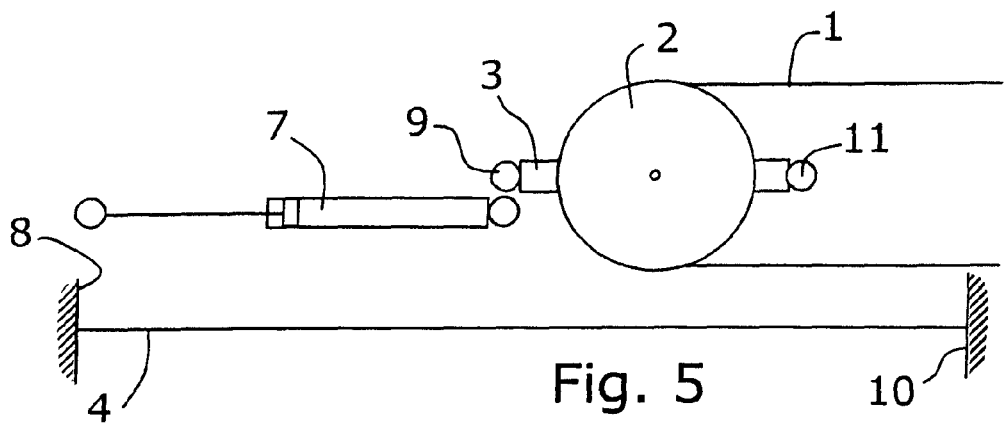
FIGS. 5 to 8 diagrammatically show a tensioning installation when the actuator is in its first position (FIGS. 5 and 6) and when the actuator is in its second position (FIGS. 7 and 8).
Figure 6:
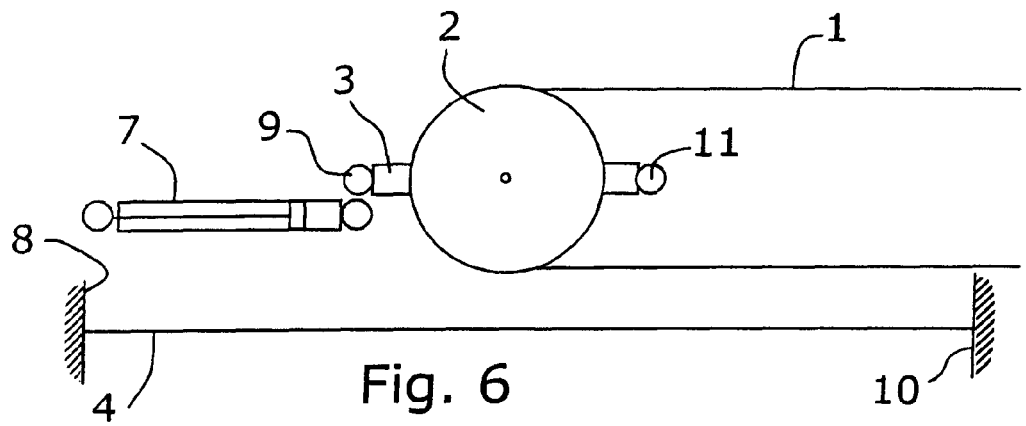

Displacement of the trolley 3 along the guide rail 4 causes the cable 1 to become slacker or tighter depending on whether the trolley 3 moves towards or away from the line. On the figures, displacement of the trolley 3 towards the left will tension the cable 1, while displacement of the trolley 3 towards the right will slacken the cable. The trolley 3 is free to move between a first extreme point at a position shown in FIGS. 1 and 5, and a second extreme point at a position shown in FIGS. 4 and 8, defining the two end points of the available adjustment range.

Displacement of the trolley 3 on the guide rail 4 is guided by any appropriate means. In FIGS. 1 to 4, the trolley 3 is fitted with a first pair of rollers 5a, 5b providing lateral guidance and a second pair of rollers 6a, 6b providing vertical guidance of the trolley 3.

The installation also comprises one or several linear actuators 7 for displacing the trolley 3. Typically, the actuator comprises a body and a rod installed free to translate relative to said body. The actuator 7 is advantageously a double acting actuator, in other words it is capable of applying tension or thrust forces on the trolley 3. In particular, the actuator may be a hydraulic, electrical or pneumatic actuator connected to a control circuit comprising regulation means for maintaining a minimum pressure in the actuator such that the tension in cable 1 is conforming with the set value of the tension for the cable 1.

According to the invention, a linear actuator 7 may be coupled to the installation in at least two different working positions.

In a first position shown in FIGS. 1, 2, 5 and 6, the actuator 7 is connected firstly to a first support point 8 fixed relative to the rail 4, and secondly to a second support point 9 fixed to the trolley 3. The actuator 7 can thus move the trolley on a first segment of the rail 4 that extends from the first extreme point to an intermediate position.

Figure 7:
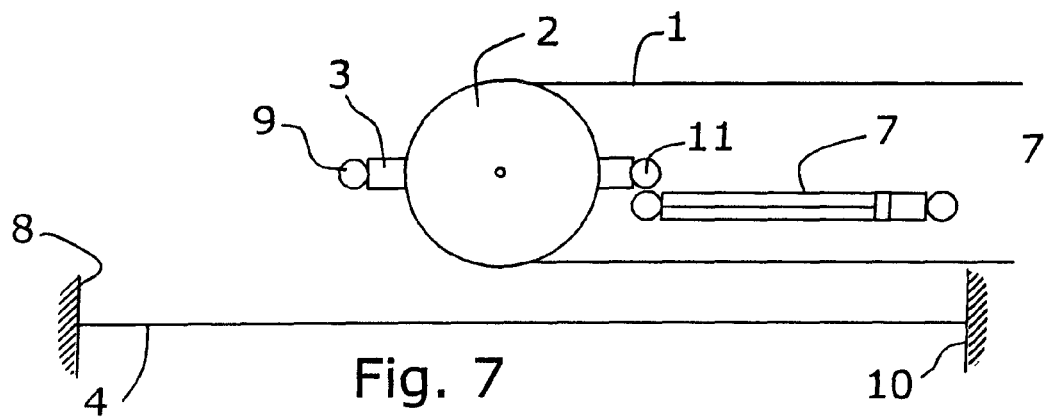
Figure 8:
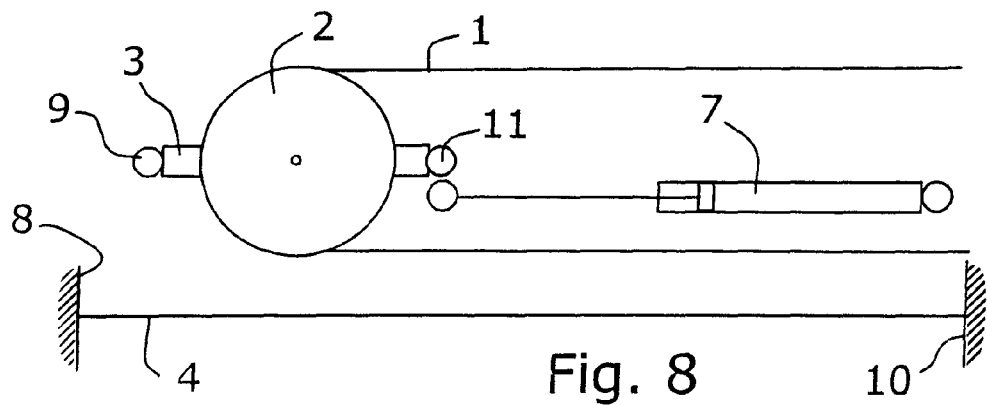

In a second position shown in FIGS. 4, 7 and 8, the actuator 7 is connected firstly to a third support point 10 fixed relative to the rail 4, and secondly to a fourth support point 11 fixed to the trolley 3. At least the third support point 10 or the fourth support point 11 is distinct from the first 8 and second 9 support points so that the trolley 3 can move on a second segment distinct from the first segment. The actuator 7 can thus move the trolley on a second segment of the rail 4 that extends from an intermediate position to the second extreme point.

Thus, allowing for two coupling positions for the actuator 7 means that the displacement range of the trolley 3 is larger than the stroke of the actuator 7.

In the embodiment shown, the installation comprises four distinct support points 8, 9, 10, 11.

The first support point 8 is fixed to the rail 4 and is located at a first end of the rail 4 opposite the line. The second support point 9 is fixed to the trolley 3 and is located at a first end of the trolley 3, facing the first end of the rail 4. In its first position, when the actuator 7 is coupled between the first 8 and second 9 support points, it applies a tension force on the trolley 3 to displace it on a first segment of the rail 4 between a first extreme point when the actuator is fully extended (see FIGS. 1 and 5) and an intermediate point when the actuator 7 is retracted (see FIGS. 2 and 6).

When the trolley 3 reaches its intermediate point and when the rod is fully retracted into the body of the actuator 7, it is no longer possible to tension the cable 1 further while holding the actuator 7 coupled in its first position. An actuator 7 has to be coupled in a second work position. To achieve this, either the actuator 7 may be decoupled from its first position and then coupled to the installation in a second position (see FIG. 3) or a second actuator 7 can be coupled to the installation in the second work position before the first actuator 7 is decoupled from the first position.

The third support point 10 is fixed to the rail 4 and is located at a second end of the rail 4. The fourth support point 11 is fixed to the trolley 3 and is located at a second end of the trolley 3, relative to a median transverse axis of the trolley 3 facing the second end of the rail 4. In its second position, when the actuator 7 is coupled between the third 10 and the fourth 11 points, it applies a thrust force on the trolley 3 and moves it along a second segment of the rail 4 between an intermediate point when the actuator 7 is extended (see FIG. 7) and a second extreme point when the actuator 7 is retracted (see FIGS. 4 and 8).

Note that the distance between the first point 8 and the third point 10 is less than the sum of the distance between the second point 9 and the fourth point 10 and twice the length of the extended actuator 7. Thus, the first displacement segment of the trolley 3 when the actuator 7 is in its first position and the second displacement segment of the trolley 3 when the actuator 7 is in its second position overlap in an intermediate zone. This intermediate overlapping zone may have a displacement range of the trolley 3 for which the actuator 7 may be coupled in its first position or in its second position. Thus, when the position of the trolley 3 is such that the set tension of the cable 1 varies about a median position between the first and the second extreme points, there is no need for an untimely change of the position of the actuator 7.

The position of the actuator 7 is determined as a function of the force that it applies for the trolley 3 positioned on the first or the second segment. Furthermore, when the force applied by the actuator corresponding to the set tension of the cable is obtained for a position of the trolley 3 between the first extreme point and the overlap zone, the actuator is kept coupled in its first position. On the other hand, when the force applied by the actuator corresponding to the set tension of the cable is obtained for a trolley 3 located between the second extreme point and the overlap zone, the actuator 7 is thus coupled in its second position. When the force applied by the actuator 7 corresponding to the set tension of the cable is obtained for a trolley 3 located in the overlap zone, the actuator 7 may indifferently be coupled in its first or its second position.

In practice, the actuator 7 will usually be placed in its first position when the installation is put into service, and controlled so as to displace the trolley on the first segment as a function of usual variations in the cable tension. Later, when the cable 1 is affected by creep deformations, it will become too deformed to be able to apply the set tension with an actuator coupled in the first position, and the actuator is thus displaced into its second position.

The mechanical means for coupling the actuator 7 to the rail at the first point 8 and the third point 10, or to the trolley 3 at the second point 9 and the fourth point 11 may be composed of any appropriate means. In the embodiment shown, these coupling means consist of a cradle composed of two flanges in which a reaming is formed. The ends of the actuator on which a ring is fitted enter between the flanges of the cradle and a screw type pin or a split pin is inserted through the reamings in the flanges and the ring to fix the actuator to the cradle.

These mechanical coupling means are fixed to the rail or project from each side of the trolley.

In a second embodiment (not shown), the actuator 7 remains fixed in its first and its second position to the same point fixed relative to the trolley 3, whereas it is fixed to a first point fixed relative to the rail in a first position and to a third point fixed relative to the rail in a second position. In other words, the second and the fourth support points are identical. Thus, in this embodiment, the actuator may be displaced between its two positions by decoupling/coupling only one of the ends of the actuator.

In a third embodiment, in the first and second position of the actuator 7, the actuator remains fixed to the same support point fixed relative to the rail 4. In other words, the first and the third points are identical.

Note that the axis of the jack has to be offset from the axis of the rail to make the second and the third embodiments possible.

It is also possible to have embodiments in which the actuator 7 can be placed in more than two different positions. For example, the actuator 7 could have four different positions. In the embodiment shown, the actuator 7 would extend between the first support point 8 and the second support point 9 in a first position, between the first point 8 and the fourth point 11 in a second position, between the third point 10 and the second point 9 in a third position, and between the third point 10 and the fourth point 11 in a fourth position.

The above description of the invention is given as examples. Obviously, those skilled in the art would be capable of making different embodiments of the invention without going outside the scope of the invention.

The invention claimed is:

1. A method for tensioning a cable using a tensioning installation comprising a mobile pulley over which said cable passes, a support trolley for said mobile pulley, on a guide rail running along a longitudinal axis between first and second end points so as to adjust the tension of the cable as a function of a set tension of the cable, and at least one linear actuator for moving the trolley along the longitudinal axis, said method comprising:

coupling said at least one actuator in a first position between a first support point fixed relative to the rail and a second support point fixed relative to the trolley such that the trolley moves on a first segment of the rail extending between the first end point and an intermediate point and said at least one actuator is controlled as a function of the set tension of the cable;

decoupling the at least one actuator from said first position; and coupling said at least one actuator, in a second position between a third support point fixed relative to the rail and a fourth support point fixed relative to the trolley, at least one of the third support point and the fourth support point being distinct from the first support point and the second support point such that the trolley moves on a second segment of the rail running between an intermediate point and the second end point and said at least one actuator is controlled as a function of the set tension of the cable.

2. The method for tensioning a cable according to claim 1, further comprising overlapping the first and second segments in an intermediate zone.

3. The method for tensioning a cable according to claim 2, further comprising coupling said at least one actuator in said first position when the force applied by the at least one actuator corresponding to the set tension of the cable is reached for a position of the trolley between the first end point and the intermediate zone and coupling the at least one actuator in said second position when the force applied by the at least one actuator corresponding to the set tension of the cable is reached for a position of the trolley between the intermediate zone and the second end point.

4. The method for tensioning a cable according to claim 1, wherein the first and third support points are distinct and the method further comprises locating the first and third support points on each side of a central point half way between the first and the second end points, and applying a tension force on the trolley with said at least one actuator when in one of said first and second position and a thrust force when in another of said first and second position.

5. The method for tensioning a cable according to claim 1, wherein the second and fourth support points are distinct and the method further comprises locating the second and fourth support points on each side of a median transverse axis of the trolley.

6. A cable tensioning installation comprising:
a mobile pulley over which a cable passes;
a support trolley for said mobile pulley, on a guide rail running along a longitudinal axis between first and second end points so as to adjust cable tension;
at least one linear actuator to move the trolley along said longitudinal axis;

means for coupling said at least one actuator between a first support point fixed relative to the rail and a second support point fixed relative to the trolley;

means for coupling said at least one actuator between a third support point fixed relative to the rail and a fourth support point fixed relative to the trolley, and at least the third and the fourth support points being distinct from the first and second support points.

7. The cable tensioning installation according to claim 6, wherein the first and the third support points are distinct and are respectively located on each side of a central point half way between the first and the second end points.

8. The cable tensioning installation according to claim 6, wherein the second and fourth support points are distinct and are respectively located on each side of a median transverse axis of the trolley.

9. The cable tensioning installation according to claim 6, wherein at least one actuator is a double acting jack.

10. A cable transport installation comprising a cable forming a closed loop between two stations, at least one vehicle drawn by the cable running between the two stations, and a cable tensioning installation according to claim 6.

\* \* \* \* \*